(12) United States Patent
Hatsuno et al.

(10) Patent No.: US 8,640,431 B2
(45) Date of Patent: Feb. 4, 2014

(54) MEDICINE PACKAGING MACHINE

(75) Inventors: Akinori Hatsuno, Gunma (JP);
Masayoshi Ogura, Tsukuba (JP);
Hideyuki Takahashi, Ota (JP)

(73) Assignee: Panasonic Healthcare Co., Ltd., Ehime (JP)

( * ) Notice: Subject to any disclaimer, the term of this patent is extended or adjusted under 35 U.S.C. 154(b) by 402 days.

(21) Appl. No.: 12/570,311

(22) Filed: Sep. 30, 2009

(65) Prior Publication Data

US 2010/0077699 A1  Apr. 1, 2010

(30) Foreign Application Priority Data

Sep. 30, 2008 (JP) ................................. 2008-254562
Sep. 30, 2008 (JP) ................................. 2008-254615

(51) Int. Cl.
*B65B 61/02* (2006.01)
(52) U.S. Cl.
USPC ................. 53/133.8; 53/520; 53/548; 53/562
(58) Field of Classification Search
USPC ......... 53/133.8, 247, 520, 548, 562; 156/510, 156/515, 251
See application file for complete search history.

(56) References Cited

U.S. PATENT DOCUMENTS

| | | | | |
|---|---|---|---|---|
| 2,994,996 A * | 8/1961 | Klar | ............................... | 53/134.2 |
| 3,663,239 A * | 5/1972 | Rowe et al. | ..................... | 426/113 |
| 3,672,119 A * | 6/1972 | Gess | ............... | 53/131.5 |
| 3,741,778 A * | 6/1973 | Rowe | ............................. | 426/107 |
| 4,254,601 A * | 3/1981 | Prager et al. | ................. | 53/133.8 |
| 4,768,411 A * | 9/1988 | Su | ................................... | 83/170 |
| 4,861,414 A * | 8/1989 | Vogan | ............................ | 156/530 |
| 4,999,968 A * | 3/1991 | Davis | ............................ | 53/133.1 |
| 5,371,997 A * | 12/1994 | Kopp et al. | ...................... | 53/412 |
| 5,722,215 A * | 3/1998 | Yuyama | ........................ | 53/374.4 |
| 5,806,280 A * | 9/1998 | Su | ...................................... | 53/412 |
| 5,875,610 A * | 3/1999 | Yuyama et al. | .................... | 53/75 |
| 5,934,048 A * | 8/1999 | Bouressa | ......................... | 53/552 |
| 5,944,946 A * | 8/1999 | Downing et al. | .............. | 156/553 |
| 5,966,898 A * | 10/1999 | Su | ................................... | 53/133.8 |
| 6,164,038 A * | 12/2000 | Kim | .............................. | 53/374.4 |
| 6,309,104 B1* | 10/2001 | Koch et al. | ...................... | 383/200 |
| 6,421,988 B1* | 7/2002 | Chiu | ................................. | 53/568 |
| 6,505,461 B1* | 1/2003 | Yasunaga | ........................ | 53/562 |
| 6,647,702 B1* | 11/2003 | Kim | ................................. | 53/568 |
| 7,395,944 B2* | 7/2008 | Inamura | ........................... | 221/65 |
| 7,493,744 B2* | 2/2009 | Nishimura et al. | ............. | 53/562 |

(Continued)

FOREIGN PATENT DOCUMENTS

| | | |
|---|---|---|
| JP | 40-006556 Y | 2/1965 |
| JP | 49-137958 U | 11/1974 |
| JP | 51-035187 A | 3/1976 |
| JP | 5-132004 A | 5/1993 |

(Continued)

*Primary Examiner* — Hemant M Desai
*Assistant Examiner* — Gloria R Weeks
(74) *Attorney, Agent, or Firm* — Westerman, Hattori, Daniels & Adrian, LLP

(57) ABSTRACT

In a medicine packaging machine including a medicine accommodating mechanism for accommodating plural medicines, a chute for guiding medicines arbitrarily taken out from the medicine accommodating mechanism to a medicine packaging sheet, and a medicine packaging mechanism having a heater for thermally welding the medicine packaging sheet, the heater is provided with an incision tooth for forming an incision at an edge portion of the medicine packaging sheet at the same time when the medicine packaging sheet filled with the medicines. Furthermore, a cutting mechanism for cutting at a predetermined position a separate package bag formed by thermally welding the medicine packaging sheet is provided.

5 Claims, 5 Drawing Sheets

(56) References Cited

U.S. PATENT DOCUMENTS

| | | | |
|---|---|---|---|
| 7,637,078 B2 * | 12/2009 | Ishiwatari et al. | 53/52 |
| 7,770,355 B2 * | 8/2010 | Inamura | 53/131.5 |
| 7,827,764 B2 * | 11/2010 | Yuyama et al. | 53/247 |
| 7,886,508 B2 * | 2/2011 | Yuyama et al. | 53/568 |

FOREIGN PATENT DOCUMENTS

| | | |
|---|---|---|
| JP | 05-132007 A | 5/1993 |
| JP | 2004-189315 A | 7/2004 |
| JP | 2005-343473 A | 12/2005 |
| JP | 2006-306419 A | 11/2006 |

* cited by examiner

MEDICINE PACKAGING MACHINE

INCORPORATION BY REFERENCE

The present application claims priority under 35 U.S.C. §119 to Japanese Patent Application No. 2008-254615 filed on Sep. 30, 2008 and Japanese Patent Application No. 2008-254562 filed on Sep. 30, 2008. The content of the applications is incorporated herein by reference in its entirety.

BACKGROUND OF THE INVENTION

1. Field of the Invention

The present invention relates to a medicine packaging machine for packaging medicines (medicines dispensed on the basis of a doctor's prescription) with a medicine packaging sheet every given dose in a hospital, a pharmacy or the like.

2. Description of the Related Art

When a patient is given a dose of medicines dispensed according to a prescription, medicines required for a dose are packaged into the same separate package (packaged bag) and dosed to the patient by an automatic medicine packaging machine or the like so that the patient can be avoided from mixing different medicines and taking these medicines (tablets or the like) by himself or herself. The medicine packaging sheet used for these separate packages (packaged bags) is sealed by thermal adhesion (welding) after medicines are put into the medicine packaging sheet, whereby many separate packages are formed as a train of linked medicine packages (see JP-A-2004-189315). This train of medicine packages are cut at predetermined positions by a cutting mechanism, and each of the separate medicine packages thus cut is supplied to each patient (see JP-A-05-132007).

However, the thermally welded medicine packaging sheet has the following problems. That is, it is difficult for a patient to cut out the welded portion when the patient unseals (breaks the seal of) the medicine packaging sheet, and also the patient may drop the medicines from the medicine packaging sheet when breaking the seal.

Furthermore, there is a method of forming a packaging sheet by using an element which is subjected to cut processing so that the side edge portion thereof is corrugated. In this case, however, the corrugated portion of the packaging sheet is also hard to be cut out for aged persons who cannot strongly pinch the packaging sheet, and also the corrugation cut processing increases the manufacturing cost.

In the conventional cutting mechanism described above, a cutter blade for cutting a medicine packaging sheet operates like sawing. Therefore, the conventional cutting mechanism has a problem that the cutting mechanism portion must be designed in a large scale and thus the installation space thereof is large.

SUMMARY OF THE INVENTION

The present invention has been implemented to solve the foregoing problems, and has an object to provide a medicine packaging machine for processing a medicine packaging sheet whose sealing can be easily unsealed and whose sealing position can be easily found.

Furthermore, the present invention has another object to provide a medicine packaging machine that can miniaturize a cutting mechanism portion and thus can be saved in space.

In order to attain the above objects, according to a first aspect of the present invention, a medicine packaging machine comprises: a medicine accommodating mechanism for accommodating plural medicines; a chute for guiding medicines arbitrarily taken out from the medicine accommodating mechanism to a medicine packaging sheet; and a medicine packaging mechanism having a heater for thermally welding the medicine packaging sheet, wherein the heater is provided with an incision tooth for forming an incision at an edge portion of the medicine packaging sheet at the same time when the medicine packaging sheet filled with the medicines.

According to the above construction, when the medicine packaging sheet is thermally welded, an incision can be formed at an edge portion of the medicine packaging sheet.

In the above medicine packaging machine, the heater may have a vertical portion extending in the width direction of the medicine packaging sheet, and a horizontal portion extending from the tip of the vertical portion in a feed direction of the medicine packaging sheet, and the incision tooth may be disposed in the horizontal portion so as to be located in the neighborhood of the tip of the vertical portion.

According to the above construction, the incision can be formed at a place near to the edge of each separate package bag.

Furthermore, in the above medicine packaging machine, the heater may be provided with a void portion around the incision tooth.

According to the above construction, the surrounding of the incision is not thermally welded by the heater.

In order to attain the above object, according to a second aspect of the present invention, a medicine packaging machine comprises: a medicine accommodating mechanism for accommodating plural medicines; a chute for guiding medicines arbitrarily taken out from the medicine accommodating mechanism to a medicine packaging sheet; a medicine packaging mechanism having a heater for thermally welding the medicine packaging sheet; and a cutting mechanism for cutting at a predetermined position a separate package bag formed by thermally welding the medicine packaging sheet, wherein the cutting mechanism has a fixed member for receiving the medicine packaging sheet and a movable member for pinching the medicine packaging sheet in cooperation with the fixed member, the movable member has a cutting blade which freely protrudes to the fixed member, and the cutting blade protrudes to push and cut the medicine packaging sheet while the medicine packaging sheet is pinched by the fixed member and the movable member.

According to the above construction, the cutting mechanism protrudes the cutting blade is protruded to push and cut the medicine packaging sheet under the state that the medicine packaging sheet is pinched by the fixed member and the movable member. Therefore, after the movable member is moved to the fixed member in a horizontal direction, the cutting blade is merely slightly pushed forwardly. Accordingly, it is unnecessary that the cutting blade is operated as if a saw is operated as in the case of a prior art, so that miniaturization of the mechanism portion can be performed and space saving can be performed.

The above medicine packaging machine may be further provided with a pair of medicine packaging sheet feeding rollers at each of the upstream side and the downstream side of the cutting mechanism so as to rotate around shafts perpendicular to a feeding direction of the medicine packaging sheet and, and a guide member which is provided between the fixed member and one of the medicine packaging sheet feeding rollers at the upstream side of the cutting mechanism and guides the front edge of the medicine packaging sheet to the cutting mechanism.

According to the above construction, after the medicine packaging sheet is cut by the cutting mechanism, the guide member guides the front edge of the subsequent medicine packaging sheet to the cutting mechanism. Therefore, the subsequent medicine packaging sheet can be stably fed into the cutting mechanism even when the front edge of the subsequent medicine packaging sheet is warped.

In the above medicine packaging machine, the movable member may be provided with a vertically long opening in which the cutting blade is retracted, and the fixed member may be provided with a recessed groove for receiving the cutting blade.

According to the above construction, the cutting blade is located within the area of the movable member, and thus the cutting blade does not overhang from the movable member, so that miniaturization can be performed.

In the above medicine packaging machine, the movable member and the cutting blade may be driven by a common driving motor. According to this construction, the actuator can be commonly used, and thus the mechanism can be simplified.

According to the present invention, the heater is provided with the incision tooth which can form an incision at an edge portion of the medicine packaging sheet at the same time when the medicine packaging sheet filled with the medicines is thermally welded. Therefore, when the medicine packaging sheet is thermally welded, the incision can be formed at the edge portion of the medicine packaging sheet. Therefore, the medicine packaging sheet can be easily unsealed (opened). Furthermore, an incision can be formed at a place near to the end (edge) of each separate package bag, and thus there is no risk that medicines are dropped when the separate package bag is opened. Furthermore, the surrounding of the incision is not thermally welded, and thus the incision can be easily found out.

Furthermore, according to the present invention, the cutting mechanism protrudes the cutting blade to push and out the medicine packaging sheet under the state that the medicine packaging sheet is pinched by the fixed member and the movable member, and then the cutting blade is lightly pushed forwardly. Accordingly, it is unnecessary that the cutter blade is operated as if sawing is executed as in the case of the prior art, so that the mechanism portion can be miniaturized and the space can be saved.

DETAILED DESCRIPTION OF THE PREFERRED EMBODIMENT

A preferred embodiment according to the present invention will be described hereunder with reference to the accompanying drawings.

Figure 1:
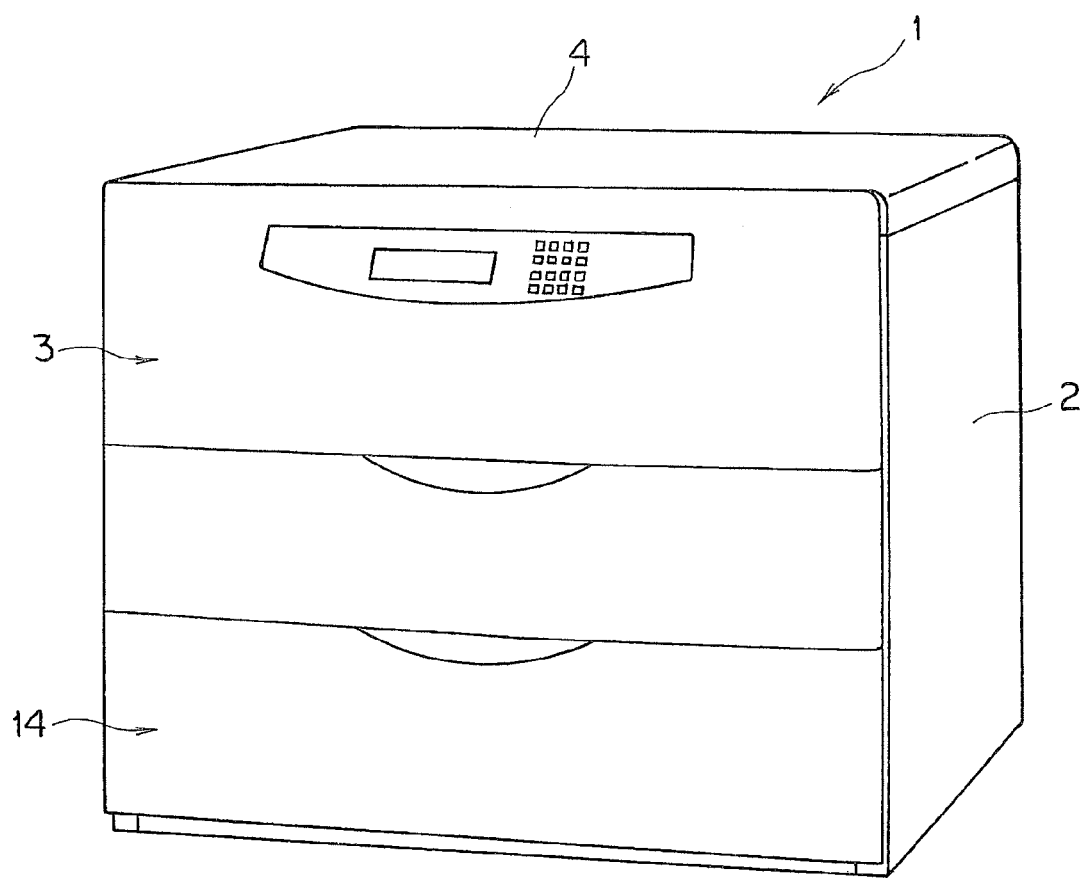
FIG. 1 is a perspective view showing the outlook of a medicine packaging machine according to an embodiment of the present invention.
Figure 2:
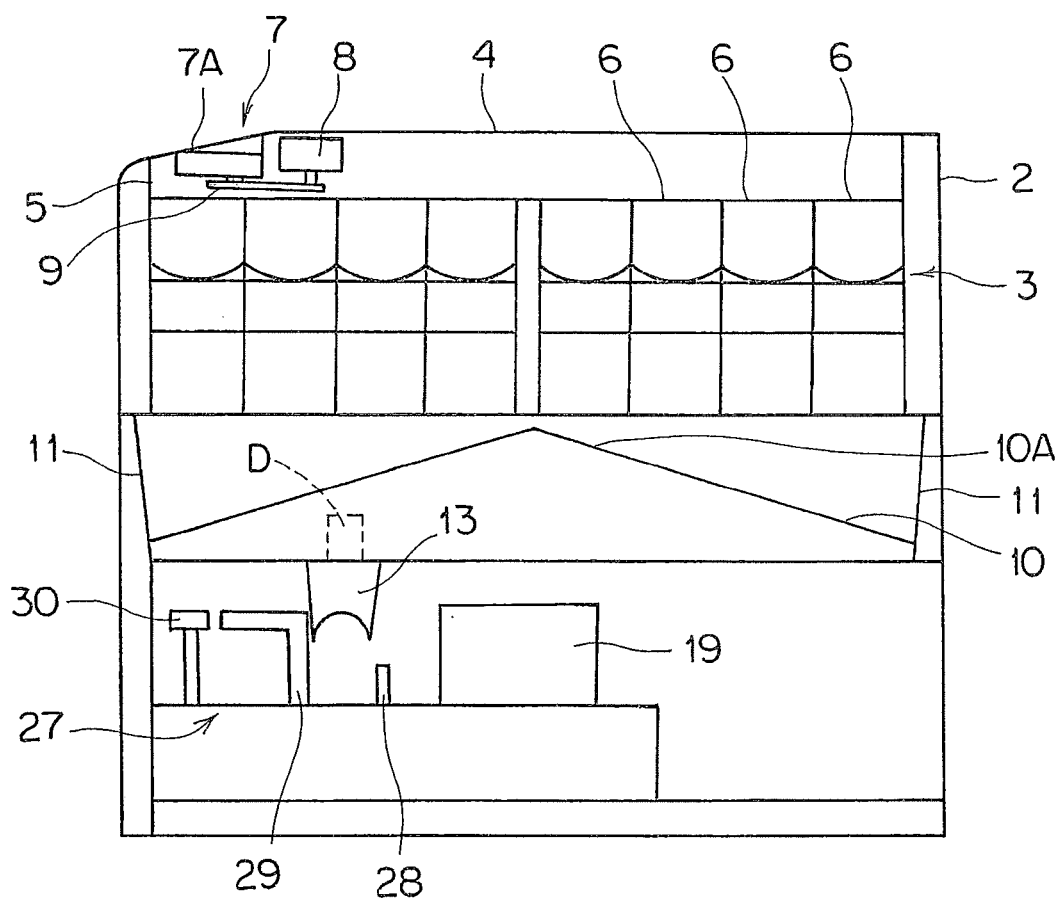
FIG. 2 is a side view of the inside of the medicine packaging machine.

FIG. 1 is a perspective view showing the outlook of a medicine packaging machine 1 for putting solid drug products as medicines into a medicine packaging sheet 20 to package the medicines in the form of a separate package (bag), and FIG. 2 is a side view of the inside of the medicine packaging machine 1 of FIG. 1. Here, in the following description, the term "medicine" is used as a target to be packaged. However, this term is broadly interpreted so as to cover general medicines such as not only tablets (small round solid pieces of medicine), but also encapsulated or wrapped powder or liquid medicine, pills, trochiscus, etc. in the following description.

The medicine packaging machine 1 is installed in a hospital, a dispensing pharmacy or the like, and it is constructed by a medicine accommodating mechanism 3 provided in a rectangular housing case 2, a medicine packaging mechanism 14 provided at the lower portion of the housing case 2, etc. A tablet case accommodating unit 5 of the medicine accommodating mechanism 3 is provided at the upper portion of the inside of the housing case 2. The opening of the upper surface of the tablet case accommodating unit 5 is closed by a top table 4 so as to be freely openable and closable.

Plural tablet cases 6 are accommodated in the tablet case accommodating unit 5, and a sub accommodating unit 7 is installed at the upper portion of the front side of the tablet case accommodating unit 5. This sub accommodating unit 7 is used to accommodate medicines which cannot be accommodated in the tablet cases 6 (for example, tables which are cut out in halves, etc.). A belt conveyor (not shown) is driven by a belt 9 wound around a pulley of a rotational shaft (not shown) of a motor 8 (the motor 8 and the belt conveyor may be connected to each other through a chain, a gear or the like). The belt conveyor is provided with a plurality of sequential accommodating compartments 7A (a train of accommodating compartments 7A).

A discharge count device such as a photosensor (not shown) or the like is provided at the lower side of each tablet case 6. The discharge count device intercommunicates with each tablet case 6 at the upper side thereof, and a motor-operated type discharge drum is contained in each discharge count device. The discharge drum is configured so that medicines as solidified drug products such as tablets, capsules, pills, trochiscus or the like creep into plural grooves formed in the side surface of the discharge drum so as to be on a line in the vertical direction. By rotation of the discharge drum, the medicines drop one by one, and the number of the dropping medicines is detected by the photosensor and counted.

A drop passage is formed at one end of the sub accommodating unit 7, and this drop passage intercommunicates with the surface of a turn table 10 described later. The medicines as described above are accommodated in the accommodating compartments 7A of the sub accommodating unit 7, and when a user operates a switch to rotate the motor 8, whereby medicines in each accommodating compartment 7A drop onto the turn table 10 through the drop passage one by one.

The disc-shaped turn table 10 for collecting medicines is disposed at the lower side of each tablet case 6 and the drop passage, and this turn table 10 has an area corresponding to the lower portions of all the tablet cases 6 and the drop passage. An upheaval portion 10A which upheaves conically is formed at the center portion of the turn table 10, and the turn table 10 is rotated at a predetermined speed by a turn table motor (not shown) provided at the lower side of the upheaval portion 10A.

An annular guide 11 is provided around the turn table 10 so as to erect, and a discharge port D is formed at a proper place of the guide 11 by notching the guide 11.

A chute 13 described later is provided at the lower side of the discharge port D, and medicines at the guide 11 side by the rotation of the turn table 10 drop into the chute 13. The chute 13 is designed in an inversed quadrangular pyramid shape so that the opened upper end thereof is opposed to the discharge port D of the turn table 10 and the opened lower end (tip) thereof is opposed to the unfolded upper surface of a two-fold packaging sheet 20.

Figure 3:
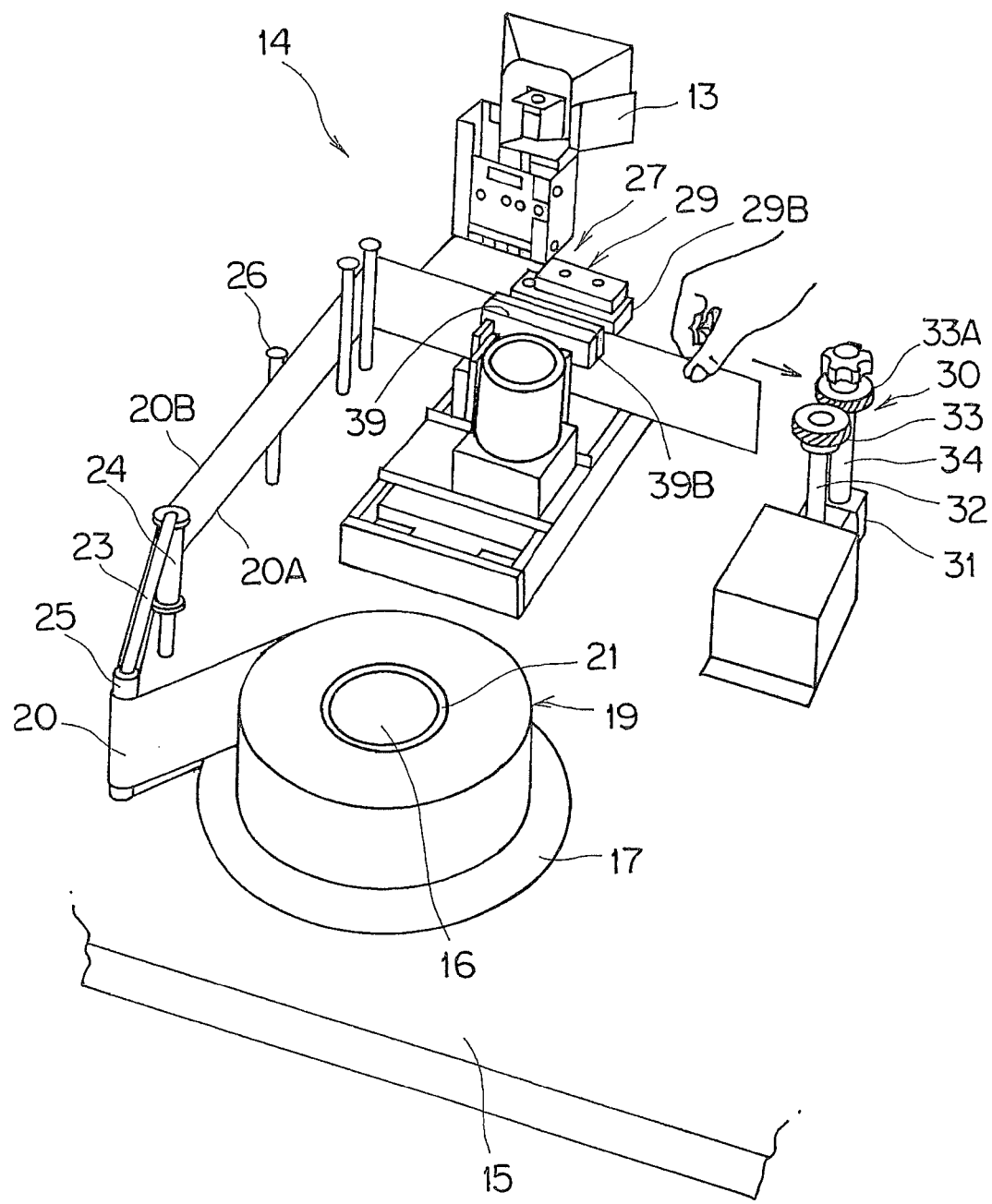
FIG. 3 is a perspective view showing a medicine packaging mechanism.

FIG. 3 shows the medicine packaging mechanism 14 provided at the lower side of the turn table 10.

The medicine packaging mechanism 14 comprises a medicine packaging sheet mount unit in which a medicine packaging sheet roll 19 described later is mounted, a guide unit for guiding a drawn-out medicine packaging sheet 20 to a predetermined position, and a pull-in unit for pulling the tip of the medicine packaging sheet 20 which are arranged on the bases 15. The medicine package sheet mount unit comprises a rotational shaft 16 which is erectly provided on the base 15 so as to be freely rotatable, a disc-shaped mount plate 17 which is located at the bottom portion of the rotational shaft 16 so as to extend outwardly, a solenoid driving type brake (not shown) disposed at the lower side of the mount plate 17 (between the mount plate 17 and the base 15), etc.

The rotational shaft 16 is designed in a cylindrical shape and has an outer diameter which is substantially equal to (or slightly smaller than) the inner diameter of a shaft member 21 of the medicine packaging sheet roll 19 described later, and this rotational shaft 16 is detachably inserted in the shaft member 21 formed in the medicine packaging sheet roll 19.

Here, the medicine packaging sheet roll 19 comprises a hollow tubular type shaft member formed of rigid synthetic resin (may be formed of thick paper) (normally called as paper tube) 21, and the medicine packaging sheet 20 around the hollow tubular type shaft member. The medicine packaging sheet 20 is designed in a longitudinal strip-shape having a predetermined width, and it is wound around the shaft member 21 in a roll shape.

The medicine packaging sheet 20 is formed as follows. A PET sheet is joined to a low-density polyethylene sheet so as to be superposed on one surface of the low-density polyethylene sheet, and two-folded at the center portion thereof so that the low-density polyethylene sheet side serves as the inner surface and both the ends are completely overlapped with each other. The medicine packaging sheet 20 is set so that the folded portion 20A of the two-folded medicine packaging sheet 20 is placed face down and the opening portion 20B (the opposite side to the folded portion 20A) of the two-folded medicine packaging sheet 20 is placed face up. The medicine packaging sheet 20 is wound around the shaft member 21 so that the folded portion 20A thereof is located at the lower end edge side of the shaft member 21 under the state that the medicine packaging sheet 20 is two-folded. The medicine packaging sheet 20 is drawn out from the terminal edge of the rolled medicine packaging sheet 20.

A tension lever 23 as the guide unit is provided to the medicine packaging mechanism 14 so as to be located at a side of the rotational shaft 16. The tension lever 23 is bridged between two rollers 24 and 25. At this time, the roller 24 is fixed to the base 15, and the roller 25 is freely swingable around the roller 24. The roller 25 is urged so as to be far away from the rotational shaft 16 by a spring member (not shown). The position of the roller 25 is detected by a switch (not shown). Reference numeral 26 represents a guide roller, and it is erectly provided at the side of the roller 24 on the base 15.

A draw-in roller 30 as a draw-in unit is provided on the base 15 so as to be located at the opposite side to the tension lever 23 with respect to the rotational shaft 16. The draw-in roller 30 comprises a pair of narrow-width rubber rollers 33 (rollers of natural rubber, synthetic rubber or the like), and they are freely rotatably secured to the upper ends of the rotational shafts 32 and 34.

Specifically, the rotational shaft 34 of the other rubber roller 33A located at the downstream side of the heat seal mechanism 27 described later is urged by a coil spring (not shown) or the like, one rubber roller 33A is brought into contact with the rubber roller 33 under a predetermined pressure, and the draw-in motor 31 rotates, whereby both the rubber rollers 33, 33A are rotated. Accordingly, the medicine packaging sheet 20 is drawn out from the medicine packaging sheet roll 19 by pinching the medicine package sheet 20 (the opening portion 20B side) between both the rubber rollers 33 and 33A.

Figure 4:
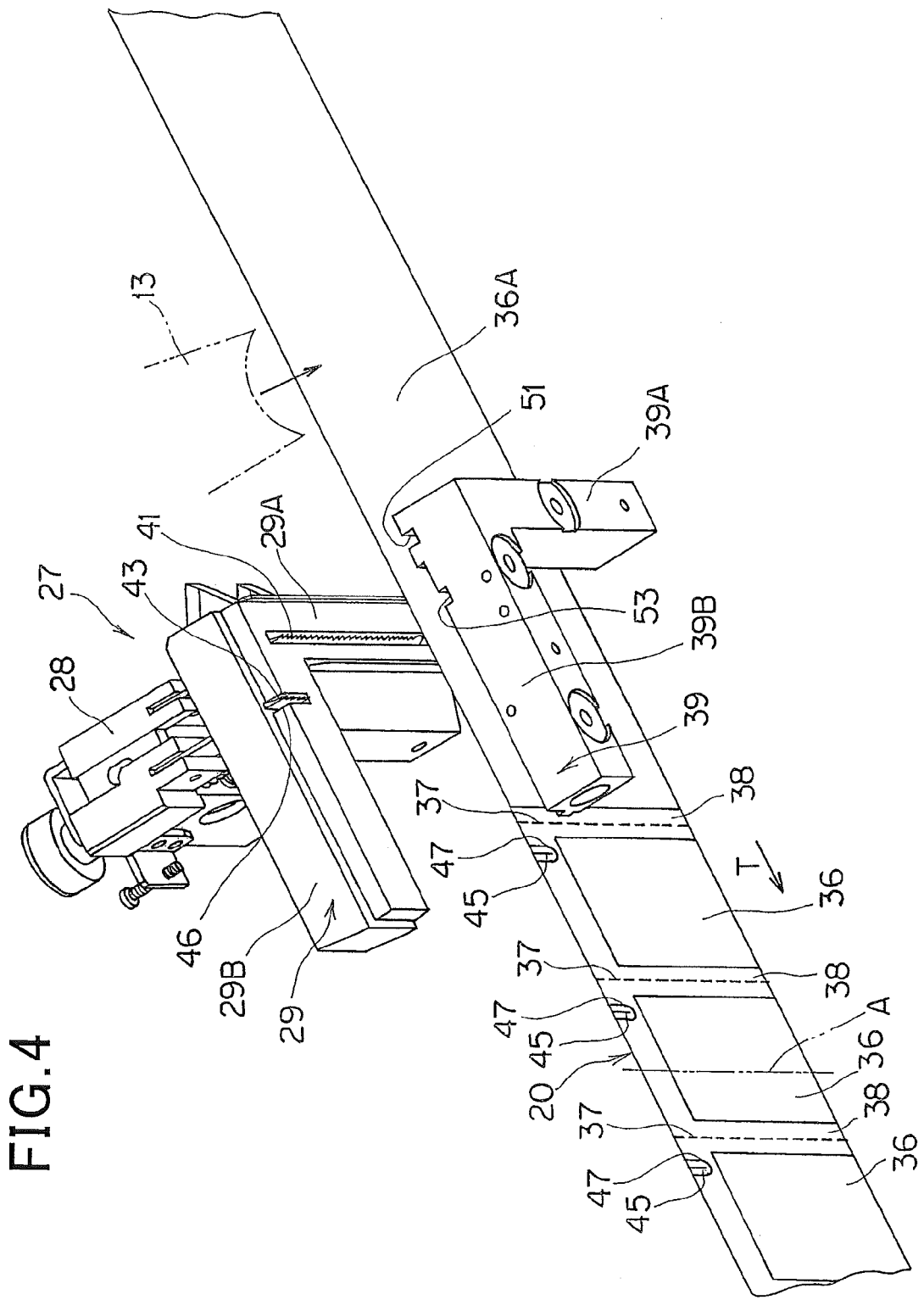
FIG. 4 is a perspective view showing a heat seal mechanism.

FIG. 4 is a perspective view showing the heat seal mechanism 27. In FIG. 4, the medicine packaging sheet 20 is fed from the right side to the left side.

The heat seal mechanism 27 is provided between the guide roller 26 and the draw-in roller 30, and has a function of sealing the opening portion 20B of the medicine packaging sheet 20 by clasping thermal welding and compartmenting the medicine packaging sheet 20 every package. The heat seal mechanism 27 comprises a pair of heaters 29 and 39 which are disposed so as to face each other through a predetermined interval. Furthermore, one of the heaters 29 is provided with an actuating device 28. The actuating device 28 is configured so that the heater 29 is freely brought into contact with or separated from the other heater 39. By supplying current to each of the heaters 29 and 39, these heaters are heated to a predetermined temperature.

The heater 29 (39) comprises a vertical portion 29A (39A) extending in the vertical direction in FIG. 4 (the short-length direction of the medicine packaging sheet 20, which is also called as "the width direction of the medicine packaging sheet 20), and a horizontal (parallel) portion 29B (39) extending from the upper end portion of the vertical portion 29A (39A) to the downstream side with respect to the feeding direction of the medicine packaging sheet 20 (the longitudinal direction of the medicine packaging sheet 20). That is, the heater 29 (39) is designed in an inverse L-shape. The vertical portions 29A and 39A of the heaters 29 and 39 thermally welds the medicine packaging sheet 20 from the folded portion 20A side to the opening portion 20B while pinching the medicine packaging sheet 20 from both the sides, thereby forming and fixing a vertical welded portion 38. Accordingly, a substantially triangular small bag 36A which is surrounded by the vertical welded portion 38 and the folded portion 20A is formed at the upstream side of the heat seal mechanism 27 under the state that the opening portion 20B has not yet been thermally welded. The chute 13 described above is located above the small bag 36A, and medicines dropping from the tablet cases 6 are put into the small bag 36A. Furthermore, the horizontal portions 29B and 39B are configured to thermally weld the opening portion 20B at the downstream side of the vertical portions 29A and 39A.

After the medicine packaging sheet 20 is thermally welded by the heat seal mechanism 27, the medicine packaging sheet 20 is moved to the draw-in roller 30 side (in the direction of T in FIG. 4) by rotation of the draw-in roller 30 by a predetermined distance. The medicine packaging sheet 20 is thermally welded by the heaters 29 and 39, whereby a separate package bag 36 which is thermally welded except for the folded portion 20A and filled with medicines is formed at the downstream side of the vertical portions 29A, 39A of the heaters 29, 39 (the draw-in roller 30 side), and also a small bag 30A is formed at the upstream side of the vertical portions 29A and 39A. Furthermore, a vertical teeth 41 extending in the vertical direction is provided to the vertical portion 29A of the heater 29. The vertical portion 39A of the heater 39 is provided with a vertical teeth receiving portion 51 for receiving the vertical teeth 41 so that the vertical teeth 41 and the vertical teeth receiving portion 51 are opposed to each other through the medicine packaging sheet 20.

The vertical teeth 41 and the vertical teeth receiving portion 51 are formed so as to be longer than the length in the vertical direction (the width direction) of the medicine packaging sheet 20, and a perforated line 37 (perforations) is formed substantially at the center of the width of the thermally welded portion (from the folded portion 20A to the opening portion 20B) while the medicine packaging sheet 20 is thermally welded from the folded portion 20A to the opening portion 20B. Accordingly, the three sides of the medicine packaging sheet 20 are thermally welded (the remaining one side corresponds to the folded portion 20A), and thus separate package bags 36 which are closed on the whole peripheries thereof are formed so that the separate package bags 36 can be separated from one another by cutting the perforated lines 37.

Furthermore, an incision tooth 43 extending in the vertical direction is provided to the horizontal portion 29B of the heater 29 so as to be located in the neighborhood of the vertical portion 29A and at the downstream side of the vertical portion 29A.

Furthermore, a incision tooth receiving portion 53 for receiving the incision tooth 43 is provided the horizontal portion 39B of the heater 39 so as to be opposed to the incision tooth 43. The incision tooth 43 and the incision tooth receiving portion 53 are formed to be shorter than the height of the horizontal portions 29B and 39B, and the upper end portions thereof are located to be higher than the opening portion 20B of the medicine packaging sheet 20. Accordingly, incisions 45 are formed at the welded portion at the upper portion of the medicine packaging sheet 20. The incisions 45 make it easy for a patient to open each separate package bag 36.

Furthermore, a void portion 46 is provided around the incision tooth 43. At this void portion 46, the medicine packaging sheet 20 is not thermally welded. Therefore, a non-welded portion 47 is formed around each incision 45.

Figure 5:
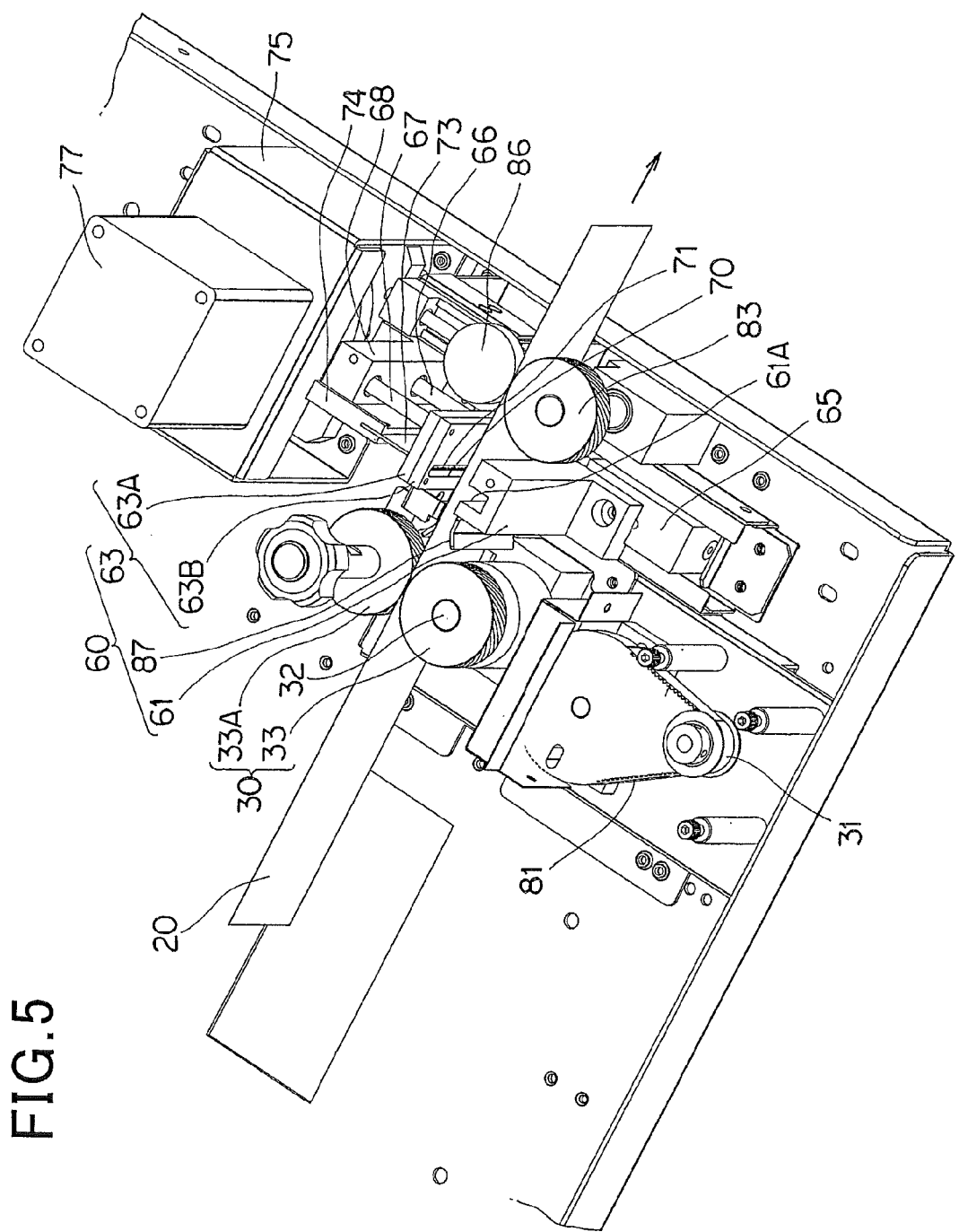
FIG. 5 is a perspective view showing a cutting mechanism.

FIG. 5 shows a cutting mechanism.

The cutting mechanism 60 is disposed at the downstream side of the pair of narrow-width rubber rollers (the medicine packaging sheet feeding rollers) 33 and 33A. The cutting mechanism 60 has a fixed member 61 for receiving the medicine package sheet 20 and a movable member 63 for pinching the medicine package sheet 20 in cooperation with the fixed member 61, and the fixed member 61 and the movable member 63 are disposed on a stool.

The movable member 63 has a base member 63A and a surface member 63B, and two joint rods 66 and 67 are fixed to the base member 63A so that the joint rods 66 and 67 are spaced from each other in the vertical direction. The two joint rods 66 and 67 are fixed to a support member 68. A vertically long opening 70 is formed in the base member 63A and the surface member 63B so as to penetrate through the base member 63A and the surface member 63B, and a saw-tooth type cutting blade 71 is mounted in the opening 70 so as to freely penetrate through the opening 70. The cutting blade 71 is formed at the tip edge of a flat-plate type cutting blade main body 73, the cutting lade main body 73 is fixed to a holder 74, and the holder 74 is juxtaposed with the support member 68.

Reference numeral 73 represents a rack in which a cam mechanism (not shown) is mounted. A driving motor 77 is fixed to the rack 75. The output shaft (not shown) of the driving motor 77 is located inside the rack 75, and the cam mechanism is joined to the output shaft. When the driving motor 77 is driven, the cam mechanism is operated to first push out the support member 68 and the holder 74 integrally and then push out the movable member 63 and the cutting blade 71 integrally.

Subsequently, when the movable member 63 abuts against the fixed member 61 while the medicine packaging sheet 20 is sandwiched therebetween, the cam mechanism pushes out only the holder 74 slightly, and thus only the cutting blade 71 is pushed out, so that the cutting blade 71 is fitted in a vertically long recessed groove 61A formed in the fixed member 61. The length of the vertically long recessed groove 61A is set to be longer than at least the width dimension of the medicine packaging sheet 20. According to this construction, only the cutting blade 71 is protruded until the cutting blade 71 is fitted in the recessed groove 61A of the fixed member 61 under the state that the medicine packaging sheet 20 is pinched by the fixed member 61 and the movable 63, whereby the medicine packaging sheet 20 is cut. The cutting blade 71 is a saw-tooth type blade. Therefore, when the cutting blade 71 is pushed out, plural sharp tip portions of the cutting blade 71 first stick into the medicine packaging sheet 20. Then, when the cutting blade 71 is further pushed out and thus fitted into the recessed groove 61A of the fixed member 61, the medicine packaging sheet 20 is pushed and cut out. When this push-and-cut operation is finished, the cutting blade 71 retreats through the operation of the cam mechanism. When the cutting blade 71 is retracted into the opening 70 of the movable member 63, the cutting blade 71 and the movable member 63 integrally retreat to the position shown in FIG. 5 and stick around. The movable member 63 and the cutting blade 71 are driven by a common driving motor 77, so that the driving mechanism can be simplified by using a common actuator.

The width-narrow rubber roller (the medicine packaging sheet feeding roller) 33 has a rotational shaft 32. A timing belt is hung around the rotational shaft 32, and the timing belt 81 is hung around the output shaft of the draw-in motor 31.

A synchronizing timing belt (not shown) is hung around the rotational shaft 32 of the rubber roller 33, and the synchronizing timing belt is hung around the narrow-width rubber roller (medicine packaging sheet feeding roller) 83 which is located at the downstream side of the cutting mechanism 60. Reference numeral 86 represents a narrow-width rubber roller paired with the rubber roller 83. According to this construction, when the draw-in motor 31 is driven, the rubber rollers (medicine packaging sheet feeding rollers) 33 and 33A are rotated through the timing belt 81, and the rubber rollers 83 and 86 are rotated through the synchronizing timing belt.

As described above, the rubber rollers 33 and 33A and the rubber rollers 83 and 86 are disposed at the upstream side and downstream side of the cutting mechanism 60, and these rollers are driven by the draw-in motor 31 to rotate around the shafts perpendicular to the medicine packaging sheet feeding direction.

A guide member 87 which is designed like a folded plate is disposed to guide the front edge of the medicine packaging sheet 20 into the gap between the fixed member 61 and the movable member 63 (the cutting mechanism 60). The guide member 87 is disposed so that the face of the guide member 87 at the movable member 63 side is located on the same plane as the face of the fixed member 61 at the movable member 63 side.

Next, the operation procedure and the operation of the medicine packaging machine 1 will be described.

First, as shown in FIG. 3, the medicine packaging sheet roll 19 is mounted on the mount plate 17 while the rotational shaft 16 is inserted into the shaft member 21 of the medicine packaging sheet roll 19. At this time, the medicine packaging sheet roll 19 is secured with the opening portion 20B of the medicine packaging sheet 20 placed face up. After the medicine packaging sheet roll 19 is mounted around the rotational shaft 16 as described above, the medicine packaging sheet 20 of the medicine packaging sheet roll 19 is drawn out from the tip thereof, successively passed over the outer portions of the rollers 25, 24 of the tension lever 23, passed over the inner portion of the guide roller 26, passed through the gap between the heaters 29 and 39 and then led to the draw-in roller 30. Then, the tip of the medicine packaging sheet 20 is inserted into the gap between the rubber rollers 33 and 33A of the draw-in roller 30, and the draw-in motor 31 is driven, so that the rubber rollers 33 and 33A pull the medicine sheet 20 from the heat seal mechanism 27 side to the opposite side (in the sheet feeding direction) while coming into contact with each other under pressure. Therefore, the medicine packaging sheet 20 is drawn into the draw-in roller 30.

According to this embodiment, in the medicine packaging machine having the medicine accommodating mechanism 3 for accommodating plural medicines (tablets, etc.), the chute 13 for guiding medicines arbitrarily taken out from the medicine accommodating mechanism 3 to the medicine packaging sheet 20 and the medicine packaging mechanism 14 having the heaters 29 and 39 for thermally welding (adhering) the medicine packaging sheet 20, the heater 29 is provided with the incision blade 43 which can incise the edge portion of the medicine packaging sheet 20 at the same time when the medicine packaging sheet 20 filled with the medicines are thermally welded. Therefore, when the medicine packaging sheet 20 is thermally welded, the incision 45 can be formed at the edge portion of the medicine packaging sheet 20, and thus the medicine packaging sheet 20 can be easily opened (unsealed).

Furthermore, the heater 29 (39) has the vertical portion 29A (39A) extending in the width direction of the medicine packaging sheet 20, and the horizontal portion 29B (39B) extending from the tip of the vertical portion 29A (39A) in the feeding direction of the medicine packaging sheet 20, and also the incision tooth 43 is provided to the horizontal portion 29B so as to be located in the neighborhood of the vertical portion 29A. Therefore, the incision 45 can be formed at a place near to the edge of each separate package bag 36. Accordingly, the position of the incision 45 is not displaced with respect to the thermally welded portion of the medicine packaging sheet 20, and thus there is no risk that medicines drop from a separate package bag 36 when the separate package bag 36 is opened.

When separate package bags 36 formed in the medicine packaging sheet 20 are different in length in the sheet feeding direction, the medicine packaging sheet 20 is thermally welded while the horizontal portions 29B and 39B are overlapped with each other in the feeding direction. Even in this case, the incision 45 is formed at a fixed position of each separate packaging bag 36 because the incision tooth 43 is located in the neighborhood of the tip of the vertical portion 29A. The heater 29 is provided with the void portion 46 formed around the incision tooth 43. Therefore, the non-welded portion 47 which is not thermally welded by the heater 29 is formed around the incision 45. Therefore, the medicine packaging sheet 20 (separate package bag 36) can be more easily unsealed (opened) from the incision 45. Furthermore, the non-welded portion 47 is provided around the incision 45, and thus the incision 45 can be easily found.

As shown in FIG. 5, when the medicine packaging sheet 20 enters the cutting mechanism 60, it is cut at a predetermined position by the cutting blade 71.

The cutting position is arbitrarily controlled, and for example, it corresponds to a position A shown in FIG. 4. In the medicine packaging sheet 20, separate package bags 36 are continuously formed, however, no medicine is put into several separate package bags located at anterior and posterior positions to the cutting position A.

In this embodiment, with respect to the separate package bag 36 filled with no medicine at the position A, the medicine packaging sheet 20 is sandwiched (pinched) by the fixed member 61 and the movable member 63, and under this state only the cutting blade 71 is protruded until it is fitted in the recessed groove 61A of the fixed member 61, whereby the medicine packaging sheet 20 can be easily cut out at the position A thereof. The width dimensions of the fixed member 61 and the movable member 63 are desired to be smaller than the width dimension of the separate package bag 36.

In this construction, the cutting mechanism 60 protrudes the cutting blade 71 to push and cut the medicine packaging sheet under the state that the medicine packaging sheet 20 is pinched by the fixed member 61 and the movable member 63. Therefore, the movable member 63 is horizontally moved to the fixed member 61 and then the cutting blade 71 is slightly pushed forwardly. Accordingly, it is unnecessary to operate the cutter blade as if the medicine packaging sheet 20 is sawed. Therefore, the mechanism portion can be miniaturized, and the space can be saved. Furthermore, the cutting blade 71 is pushed out (protruded) under the state that the medicine package sheet 20 is pinched by the fixed member 61 and the movable member 63 under tension, so that the medicine packaging sheet 20 can be surely and finely cut out.

The guide member 87 for guiding the front edge of the medicine packaging sheet 20 to the cutting mechanism 60 is provided between the rubber roller 33 and the fixed frame 61 at the upstream side of the cutting mechanism 60. Therefore, after the medicine packaging sheet 20 is cut in the cutting mechanism 60, the guide member 87 guides the front edge of the subsequent medicine packaging sheet 20 to the cutting mechanism 60. Accordingly, even when curved warpage occurs at the front edge portion of the subsequent medicine packaging sheet 20, the front edge portion of the medicine packaging sheet 20 can be stably fed into the cutting mechanism 60.

The vertically long opening 70 in which the cutting blade 71 is retracted is formed in the movable member 63. Therefore, the cutting blade 71 is located within the area of the movable member 63, and thus the cutting blade 71 do not overhang from the movable member 63, so that miniaturization can be performed.

The present invention has bee described above, however, it is not limited to the above embodiment. For example, in the above embodiment, the movable member 63 and the cutting blade 71 are driven by the cam mechanism joined to one driving motor 77. However, the power transmission mechanism is not limited to the cam mechanism, and any member such as a crank mechanism or the like may be used insofar as it can drive the movable member 63 and the cutting blade 71 and finally protrude the cutting blade.

What is claimed is:
1. A medicine packaging machine comprising:
a medicine supplier to accommodate plural medicines;
a chute to guide medicines supplied from the medicine supplier to a medicine packaging sheet; and
a medicine packaging sheet welder having a heater unit for thermally welding the medicine packaging sheet, wherein the heater unit is provided with an incision tooth for forming an incision at an edge portion of the medi- cine packaging sheet at the same time when the medicine packaging sheet filled with the medicines is thermally welded, wherein the heater unit has a vertical portion extending in the width direction of the medicine packaging sheet, and a horizontal portion, contiguous with, and extending from, the tip of the vertical portion in a feed direction of the medicine packaging sheet, and the incision tooth is disposed in the horizontal portion so as to be located in the neighborhood of the tip of the vertical portion, and wherein the heater unit comprises a pair of heaters each of which has a vertical portion and a horizontal portion, the horizontal portion of one of the heaters is provided with the incision tooth, the horizontal portion of the other heater is provided with an incision tooth receiving portion into which the incision tooth is inserted while the medicine packaging sheet is clasped by the horizontal portions of the pair of heaters, the incision tooth and the incision tooth receiving portion are formed to be shorter than the height in a vertical direction of the horizontal portions, and the incision is formed so as to extend downwards from one end of a welded portion at an upper portion of the medicine packaging sheet to a predetermined position in the vertical direction of the welded portion when the incision tooth is inserted into the incision tooth receiving portion; wherein the horizontal portion forms a non-welded portion which is not thermally welded by the horizontal portion in an area thermally welded by the horizontal portion, and the incision tooth forms the incision in the non-welded portion.

2. The medicine packaging machine according to claim 1, wherein the heater is provided with a void portion around the incision tooth.

3. The medicine packaging machine according to claim 1, wherein the heater is provided with a vertical tooth disposed in the vertical portion to form a perforated, and the incision tooth and the vertical tooth are arranged in the same direction.

4. The medicine packaging machine according to claim 1, further comprising an actuating device for actuating the heater unit, wherein the heater unit comprises a pair of heaters, and the actuating device is configured to bring the heaters into contact with each other so that a welding target portion of the medicine packaging sheet is wholly clasped and welded all at once by the heaters simultaneously with formation of the incision and then separate the heaters from each other so that the welded medicine packaging sheet is fed out of the medicine packaging sheet welder.

5. A medicine packaging machine comprising:
   a medicine supplier to accommodate plural medicine;
   a chute to guide medicines supplied from the medicine supplier to a medicine packaging sheet; and
   a medicine packaging sheet welder having a heater unit for thermally welding the medicine packaging sheet, wherein the heater unit is provided with an incision tooth for forming an incision at an edge portion of the medicine packaging sheet at the same time when the medicine packaging sheet filled with the medicines is thermally welded,
   wherein the heater unit has a vertical portion extending in the width direction of the medicine packaging sheet, and a horizontal portion, contiguous with, and extending from, the tip of the vertical portion in a feed direction of the medicine packaging sheet, and the incision tooth is disposed in the horizontal portion so as to be located in the neighborhood of the tip of the vertical portion, and
   wherein the horizontal portion forms a non-welded portion which is not thermally welded by the horizontal portion in an area thermally welded by the horizontal portion, and the incision tooth forms the incision in the non-welded portion.

* * * * *